US012355830B2

(12) United States Patent
Lu et al.

(10) Patent No.: US 12,355,830 B2
(45) Date of Patent: Jul. 8, 2025

(54) TRANSFERRING A PHONE CALL INTO A VIDEO CONFERENCING SESSION

(71) Applicant: Zoom Communications, Inc., San Jose, CA (US)

(72) Inventors: Defeng Lu, San Jose, CA (US); Bin Hu, Los Gatos, CA (US); Ji Park, San Jose, CA (US); Vi Dinh Chau, Seattle, WA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/348,697

(22) Filed: Jul. 7, 2023

(65) Prior Publication Data

US 2023/0353615 A1    Nov. 2, 2023

Related U.S. Application Data

(62) Division of application No. 16/825,674, filed on Mar. 20, 2020, now Pat. No. 11,805,158.
(Continued)

(51) Int. Cl.
*H04L 65/403* (2022.01)
*H04L 65/1104* (2022.01)
(Continued)

(52) U.S. Cl.
CPC ........ *H04L 65/403* (2013.01); *H04L 65/1104* (2022.05); *H04L 65/75* (2022.05); *H04M 3/567* (2013.01); *H04N 7/152* (2013.01)

(58) Field of Classification Search
CPC ... H04L 65/403; H04L 65/1104; H04L 65/75; H04L 65/1063; H04L 65/1089;
(Continued)

(56) References Cited

U.S. PATENT DOCUMENTS 6,694,351 B1    2/2004    Shaffer et al.
6,975,622 B2    12/2005    Korycki et al.
(Continued)

OTHER PUBLICATIONS

International Search Report and Written Opinion mailed on Apr. 13, 2022 in corresponding PCT Application No. PCT/US2022/014130.

*Primary Examiner* — Anh Nguyen
(74) *Attorney, Agent, or Firm* — Young Basile Hanlon & MacFarlane, P.C.

(57) ABSTRACT

An apparatus and/or method discloses an automatic call-to-conference elevation ("ACE") capable of facilitating a transition from a phone call to a video conference. An ACE process, in one embodiment, is able to activate an ACE application to elevate user devices from participating in an audio call to a video conference based on a conference selection selected by a meeting initiator, host, or attendee. After identifying the capabilities, attributes, and/or functionalities associated with the user devices in accordance with activation of ACE, a communication network coupling the user devices as meeting attendees is established for facilitating the video conference based on identified capabilities, attributes, and/or functionalities of the user devices. In one aspect, the process is capable of transitioning connections of the user devices from an audio call to a video conference.

20 Claims, 6 Drawing Sheets

Related U.S. Application Data

(60) Provisional application No. 62/821,319, filed on Mar. 20, 2019.

(51) Int. Cl.
  *H04L 65/75* (2022.01)
  *H04M 3/56* (2006.01)
  *H04N 7/15* (2006.01)

(58) Field of Classification Search
  CPC .............. H04L 65/1093; H04M 3/567; H04M 2201/50; H04M 2203/5018; H04M 3/58; H04N 7/152
  See application file for complete search history.

(56) References Cited

U.S. PATENT DOCUMENTS

| | | | |
|---|---|---|---|
| 8,744,420 | B2 | 6/2014 | Cranfill et al. |
| 10,142,464 | B1 | 11/2018 | Cairns et al. |
| 2004/0120498 | A1 | 6/2004 | Sylvain |
| 2007/0118656 | A1 | 5/2007 | Anderson et al. |
| 2008/0039010 | A1 | 2/2008 | Vance et al. |
| 2008/0260116 | A1 | 10/2008 | Didcock |
| 2011/0009122 | A1* | 1/2011 | Kalavade .............. H04M 7/006 455/445 |
| 2011/0149811 | A1 | 6/2011 | Narayanaswamy |
| 2011/0249079 | A1 | 10/2011 | Santamaria et al. |
| 2012/0207296 | A1 | 8/2012 | George et al. |
| 2013/0091298 | A1 | 4/2013 | Ozzie et al. |
| 2013/0173706 | A1* | 7/2013 | Broadworth ........ H04L 12/1818 709/204 |
| 2015/0023222 | A1* | 1/2015 | Logan ................... H04M 3/567 370/260 |
| 2015/0049157 | A1 | 2/2015 | Krishnamoorthy et al. |
| 2015/0319407 | A1* | 11/2015 | Frankel ................. H04N 7/186 348/14.02 |
| 2018/0032997 | A1 | 2/2018 | Gordon et al. |
| 2018/0034970 | A1* | 2/2018 | Quilici ................ H04L 65/1093 |
| 2018/0160074 | A1 | 6/2018 | Mercredi et al. |
| 2019/0141292 | A1* | 5/2019 | Thakkar .............. H04L 12/1818 |
| 2019/0355194 | A1* | 11/2019 | Reid ....................... H04M 3/54 |
| 2020/0177647 | A1 | 6/2020 | Ravichandran |
| 2020/0304547 | A1 | 9/2020 | Lu et al. |

* cited by examiner

TRANSFERRING A PHONE CALL INTO A VIDEO CONFERENCING SESSION

CROSS-REFERENCE TO RELATED APPLICATION(S)

This application is a divisional of U.S. patent application Ser. No. 16/825,674, filed Mar. 20, 2020, which claims the benefit of U.S. Provisional Patent Application No. 62/821,319, filed Mar. 20, 2019, the entire disclosures of which are hereby incorporated by reference.

FIELD

The exemplary embodiment(s) of the present invention relates to the field of network communication. More specifically, the exemplary embodiment(s) of the present invention relates to provide a video conference meeting.

BACKGROUND

With increasing popularity of digital electronics and network communication, real-time interactive video conferences become ever more popular. For example, video conferencing applications allow people to communicate with each other in remote locations through audio and video media in real time. In some instances, there is a desire to present visual content as well as audio sharing to other attendees during a video conference.

To provide a conference call, an ability to establish a typical multiparty telephone call where all parties can hear and speak with one another simultaneously has been in use in the past. A conventional multiparty call, for example, can be established through PSTN or Voice over Internet Protocol and requires a telephone number or Session Initiated Protocol URI to establish signaling and connectivity.

A traditional on line meeting, for example, is typically initiated by an individual, whereby a meeting invitation link is offered to a host to invite other participants. The participants in turn use the link to determine the location of the meeting. Host and participants are typically required to utilize proprietary applications or optimized browsers to access the meeting. To attend an online meeting, participants typically are provided with a telephone number to call-in via PSTN or VoIP phone lines to connect to the meeting.

A drawback associated with a traditional conference call is that it is often difficult to transfer a phone call to a conference call. For example, with different communication network, there is no easy process to transition from a standard multiparty telephone call to a rich meeting experience. A traditional method to transit from phone calls to conference call is to disconnect some or all participants (or users) and manually determine the best method to join the meeting. For example, PSTN users typical need to find the meeting dial-in number and meeting (and participant) ID in order to join the meeting, while online participants must join with the appropriate applications. The problem with this traditional approach is cumbersome and often fraught with delays and errors.

SUMMARY

On embodiment of the present invention discloses an automatic call-to-conference elevation ("ACE") capable of facilitating a transition from a phone call to a video conference. An ACE process, in one embodiment, is able to activate an ACE application to elevate user devices from participating in an audio call to a video conference based on a conference selection selected by a meeting initiator, host, or attendee. After identifying the capabilities, attributes, and/or functionalities associated with the user devices in accordance with activation of ACE, a communication network coupling the user devices as meeting attendees is established for facilitating the video conference based on identified capabilities, attributes, and/or functionalities of the user devices. In one aspect, the process is capable of transitioning connections of the user devices from an audio call to a video conference.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
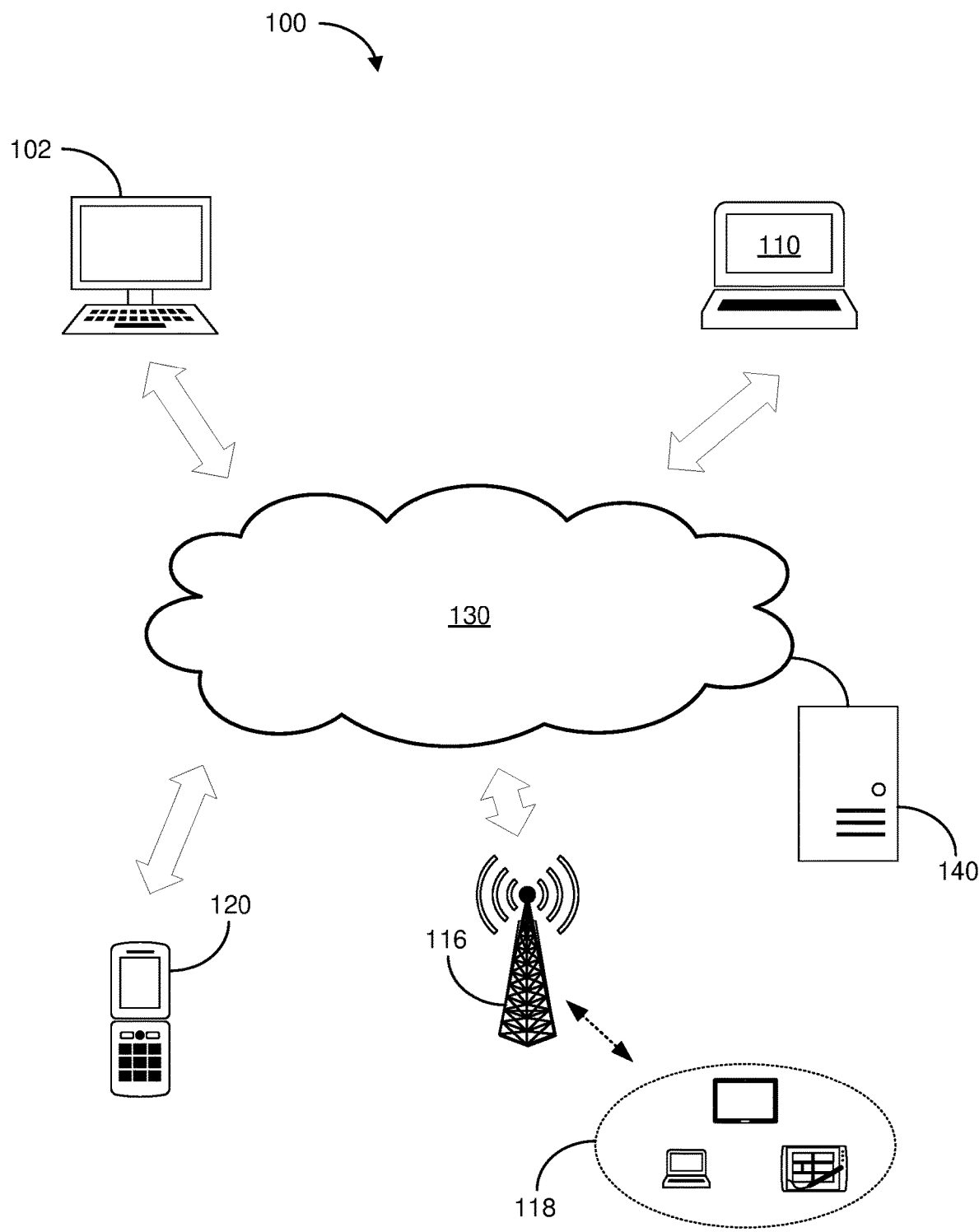
FIG. 1 is a block diagram illustrating an automatic call-to-conference elevation ("ACE") capable of facilitating a transition from a phone call to a video conference utilizing in accordance with one embodiment of the present invention.

Embodiments of the present invention disclose a method(s) and/or apparatus for providing an online real-time interactive conference capable of facilitating a transition from a phone call to a video conference.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The terms "computer", "smartphone", or "portable devices" includes a processor, memory, and buses capable of executing instruction wherein the computer refers to one or a cluster of computers, personal computers, workstations, mainframes, or combinations of computers thereof.

On embodiment of the present invention discloses an automatic call-to-conference elevation ("ACE") capable of facilitating a transition from a phone call to a video conference. An ACE process, in one embodiment, is able to activate an ACE application to elevate user devices from participating in an audio call to a video conference based on a conference selection selected by a meeting initiator, host, or attendee. After identifying the capabilities, attributes, and/or functionalities associated with the user devices in accordance with activation of ACE, a communication network coupling the user devices as meeting attendees is established for facilitating the video conference based on identified capabilities, attributes, and/or functionalities of the user devices. In one aspect, the process is capable of transitioning connections of the user devices from an audio call to a video conference.

During a video conferencing session, participants can communicate with each other via voice, video and screen sharing. Screen sharing can include sharing content of the presenter's screen which includes graphics, video, images, and documents with other attendee participants. Endpoint devices are typically operated by the video conferencing participants and can transmit and receive voice, video and screen sharing content during a web conferencing session. Each of the endpoint devices represents participants and each participant can be either a presenter which shares information, an attendee which receives information, or both presenter and attendee at the same time. Roles of the participants can dynamically change between presenter and attendee during the same video conferencing session.

During the video conferencing session, a group photograph is created of the participants of the video conferencing session. Although the participants are in different physical locations and using different endpoint devices, the group photograph is created as if the participants were located in a single location and posing for the group photograph at the same time. The endpoint devices include computers, tablet PCs, and smart phones are widely used in the workplace as well as at home.

FIG. 1 is a block diagram 100 illustrating an ACE application capable of facilitating a transition from a phone call to a video conference in accordance with one embodiment of the present invention. In one approach, various user devices, systems, computers, portable devices, and/or smart phones use ACE application for a real-time interactive video conference. Diagram 100 discloses a server computer 140 coupled to a network 130, which is also coupled to client computers 102, 110, and 120 as attendee's systems or devices. Server computer 140, in one example, is further coupled to a group of wireless or portable devices (as client computers 118) via a base station 116. In one example, server computer 140 may represent an instance among a large instances of application server in a data center, cloud computing environment, or any other mass computing environment. There also may include thousands or millions of client computers. It should be noted that the underlying concept of the exemplary embodiment(s) of the present invention would not change if one or more blocks (or systems) were added to or removed from diagram 100.

In an embodiment, server computer 140 hosts a video conferencing meeting and transmits and receives video, image, and audio data to and from each of the client computers 102, 110, 118, 120. Each of the client computers 102, 110, 118, 120 includes a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 102, 110, 118, 120 may include an integrated or separate display unit such as a computer screen, TV screen or other display. Client computers 102, 110, 118, 120 may comprise any of mobile or stationary computers including desktop computers, laptops, netbooks, ultrabooks, tablet computers, smartphones, et cetera. It should be noted that GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 102, 110, 118, 120 hosts, in an embodiment, an application that allows each of the client computers 102, 110, 118, 120 to communicate with the server computer 140. In an embodiment, the server computer 140 may maintain a list of accounts, each associated with one of the client computers 102, 110, 118, 120 and/or one or more users of the client computers.

In one embodiment, each of the client computers 102, 110, 118, and 120 can be used by one or more attendees or participants for participating a video conference session using the ACE application. Client computers 102, 110, 118, and 120 can be simultaneously a presenter and recipient attendee of a video conference session.

An advantage of employing ACE is that the ACE application facilitates a seamless transition from a phone call to a video conference without disconnecting other meeting attendees from an existing video conference.

The terms "video conference," "Zoom meeting," "real-time interactive video conference session," "video conference session," "real-time interactive video conference," and "conference meeting," are referring to the same or substantially similar live meeting settings and they can be used interchangeably. For example, a video conference is capable of linking multiple meeting attendees situated in different geographic locations for sharing video, audio, data, files, and the like. The terms "user device," "attendee system," "participant device," "user system," and "meeting device" refer to the same or similar apparatus that is capable of participating the video conference based on individual system capabilities. For example, while some devices can participate meeting with all available multimedia presentations while other devices can only participate limited media such as voice only.

Figure 2:
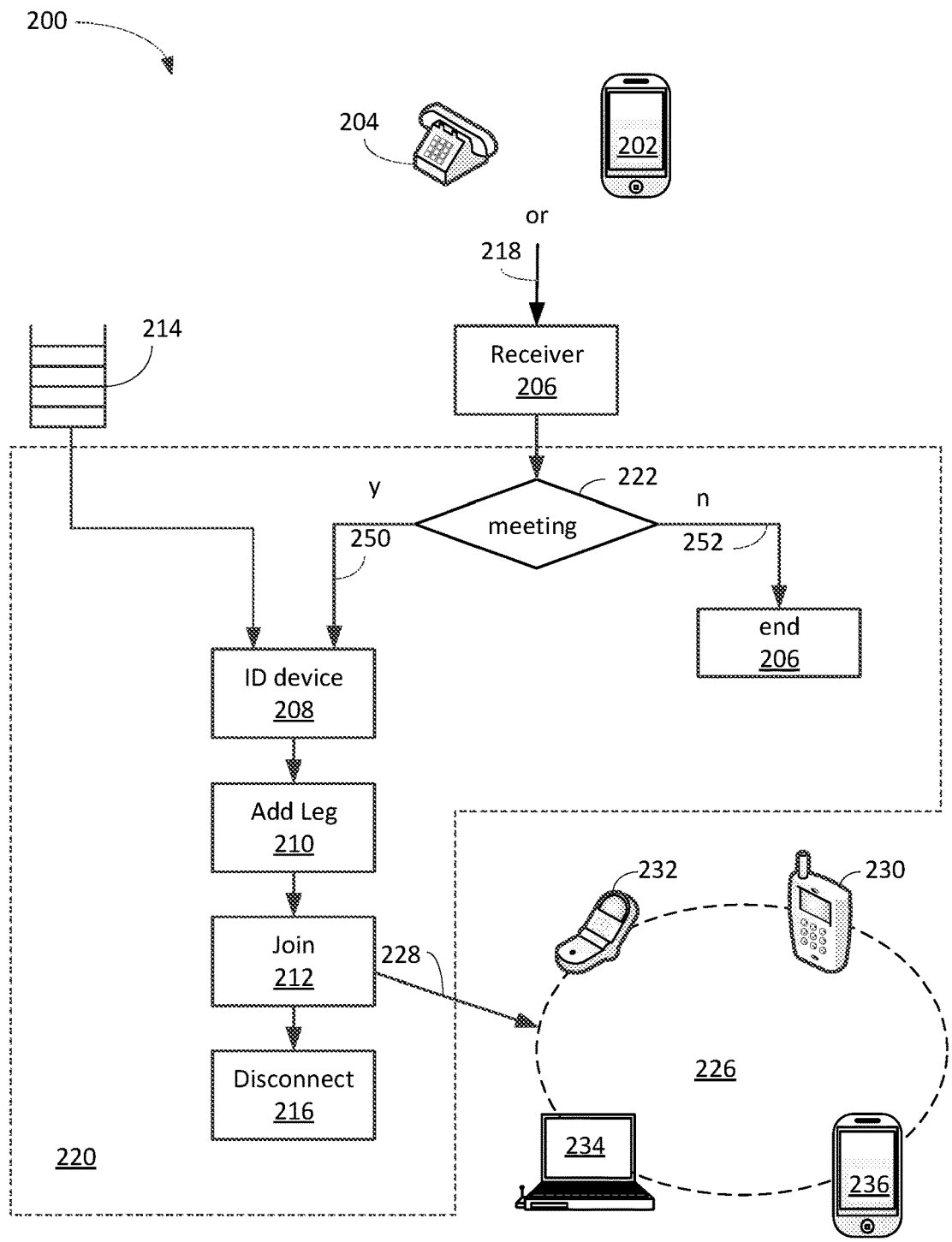
FIG. 2 is a logic block diagram illustrating a process of ACE for elevating an incoming call to a video conference in accordance with one embodiment of the present invention.

FIG. 2 is a logic block diagram 200 illustrating a process of ACE for elevating an incoming call to a video conference in accordance with one embodiment of the present invention. Diagram 200 includes an incoming call device, an existing video conference session 226, ACE module 220, and receiver 206. In one embodiment, diagram 200 further includes a database 214 used to record capabilities, functionalities, and/or attributes associated with registered user devices referenced by addresses such as phone numbers. While the device capability relates to system applications, device attributes relate to system specifications. It should be noted that the underlying concept of the exemplary embodiment(s) of the present invention would not change if one or more blocks (or components) were added to or removed from diagram 200.

Incoming phone call device, in one embodiment, can either be a smartphone 202 or a traditional phone 204. Smartphone 202, in one example, can be any types of mobiles, portable phones, and/or multi-purpose portable computers. A function of smartphone 202 is capable of connecting to network, such as Internet, cellular network, Wi-Fi network, Bluetooth network, and/or satellite connections. Traditional phone 204, on the other hand, is a conventional telecommunication device permitting two or more users to have a voice conversation. It should be noted that a traditional telephone is limited to functions by converting signals between voice and electronic information through lines managed by Public Switched Telephone Network ("PSTN").

Existing video conference session 226 is a real-time interactive video conference in session containing four attendees via four user devices 230-236. The user devices include portable phone(s) 230, traditional phone(s) 232, laptops 234, and iPhone(s) 236. In one aspect, existing video conference session 226 is already established when a new incoming call is received.

ACE module 220 includes a meeting selection 222, ID submodule 208, leg submodule 210, join submodule 212, and disconnection submodule 216. Upon receipt of an incoming call 218 initiated by phone (e.g., the smartphone 202 or the traditional phone 204), meeting selection 222 launches a prompt or banner to one or more attendee's devices indicating whether incoming call 218 should be allowed to join existing video conference session 226. If the selection is yes as indicated by numeral 250, the ACE process proceeds to ID submodule 208 starting a seamless joining procedure. If the selection is no as indicated by numeral 252, the ACE process proceeds to end block 206 indicating that the incoming call is rejected (such that a rejection of the prompt results in a rejection of the PSTN call).

At ID submodule 208, the ACE process identifies the capabilities or functionalities of a user device (e.g., the smartphone 202 or the traditional phone 204) that initiates the incoming call via stored data in database 214. After identification of device capabilities, the ACE process proceeds to leg submodule 210 to add a session or leg to facilitate new incoming call 218. At join submodule 212, new incoming call 218 is directed to join existing video conference session 226 as indicated by numeral 228. At disconnection or disconnect submodule 216, the ACE process discounts the original incoming call connection as soon as the incoming call is joined existing video conference session 226.

In one embodiment, the ACE application or process engages two or more parties to participate in an audio conference to automatically transition to a meeting experience with the ability to share video, collaborate content, and co-author content, in which one of the parties or attendees starts on a PSTN call. In operation, when the functionality is invoked, the system automatically detects the capabilities of each participant device and determines the best experience that each user can achieve based on the participant device. For PSTN participants, the participates can be seamlessly transitioned to the immersive meetings experience as audio-only participants (i.e., in an audio-only mode). If participants' devices are video and/or content sharing capable, such devices will be seamlessly transitioned to the immersive meetings experience as participants capable of using audio, video and content sharing capabilities.

In one embodiment, if any of the participants receives a subsequent PSTN call from another party, the PSTN call can be seamlessly transitioned into the meeting. When parties are on an audio conference and one of the participants receives an incoming meeting invite, the one of the participants, in one example, has the ability transition all other participants into the (new) meeting together. Each participant will be recognized individually in the meeting roster with functionality respective to their setup.

ACE module 220, in one aspect, provides a method to seamless transition all participants of an establish multiparty telephone call, who are using different communication protocols, applications and services, to automatically be combined into an online meeting. To improve overall experience of an interactive video conference, ACE module 220 is capable of automatically collecting and analyzing capabilities of participant device(s) to determine functionality that should be presented to each individual.

During an operation, the participant devices with basic telephony capability (to hear and speak) will be placed in the meeting as telephone participants. It should be noted that the various capabilities, functionalities, or attributes are identified with phone numbers they use. For example, if the phone number is associated with a name within the ACE system, the name will be displayed to replace the phone number. It should be noted that the telephone participant is limited to their ability to mute/unmute or disconnect from the service.

For participants using full featured applications, such participants have visibility to understand other participants are in the meeting. It should be noted that the terms participants, attendees, parties, user devices can be referred to the same or similar meanings. In one aspect, the ACE process or module is able to determine if the participant's device can support video sharing to adjust the interface and access accordingly.

If the participant device is capable, videos and content sharing are enabled to share with other participants. When content is being shared, the participants have the ability to request and control the content or annotate content as well as displaying in a virtual background (without a green screen). If a participant has host control, the participant will be presented with additional capabilities to manage other participants.

After a meeting or video conference session is established, any participant with advanced meeting capabilities will have the ability to transfer additional PSTN callers to the meeting. For example, when a participant receives an incoming call from another PSTN caller, rather than needing to provide the caller with the meeting dial-in number and conference ID (and participant code), the participant can seamlessly transfer the caller into the meeting. The transferred caller will automatically be placed in the meeting and appear as a participant in the roster and identifiable by the phone number or name if the caller is registered in the system.

In one embodiment, the ACE application is able to facilitate providing elevate services such as video voicemail for devices that are capable. For example, when a smartphone initiates a PSTN call to a phone number, the voicemail portion detects capability of the smartphone and transfers the PSTN call to a video conferencing call. During a video conferencing call, an outgoing message can be presented via a video voicemail through the smartphone. The smartphone user can leave a video voicemail message.

An advantage of employing ACE is that ACE facilitates a seamless transition from one or more phone calls to a video conference.

Figure 3:
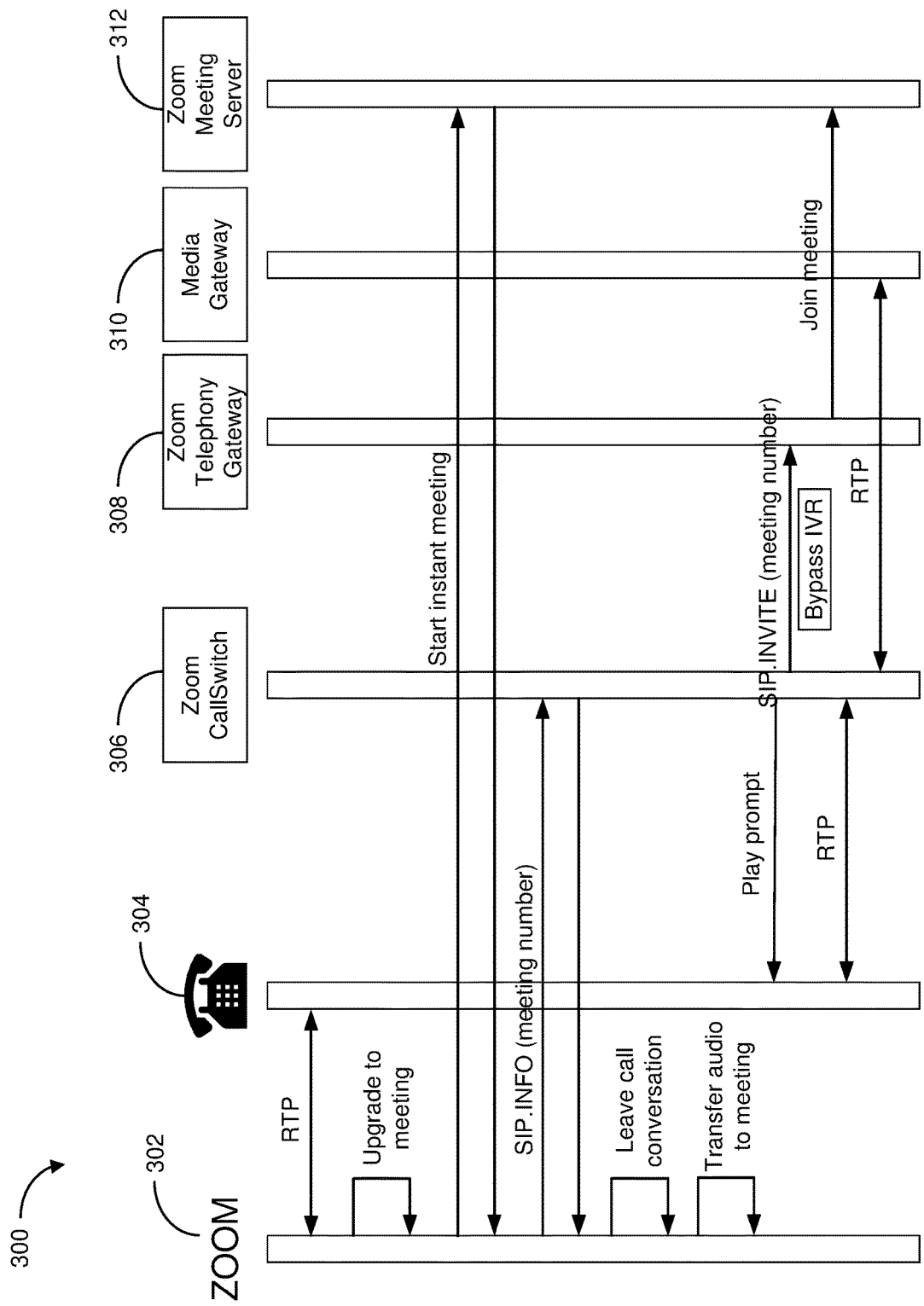
FIG. 3 is a logic diagram illustrating a sequence of upgrading a call to Zoom meeting in accordance with one embodiment of the present invention.

FIG. 3 is a logic diagram 300 illustrating a sequence of upgrading a call to Zoom meeting in accordance with one embodiment of the present invention. Diagram 300 includes Zoom or ACE application 302, PSTN phone 304, call switch 306, telephony gateway 308, media gateway 310, and meeting server 312. It should be noted that the underlying concept of the exemplary embodiment(s) of the present invention would not change if one or more blocks (or devices) were added to or removed from diagram 300.

Zoom or ACE application 302, in one embodiment, is referred to various applications including ACE application capable of facilitating a real-time interactive video conference facilitated, managed, and supported by Zoom Communications, Inc. of San Jose, Calif PSTN phone 304 is used to initiate an incoming call and call switch 306 serves to route audio calls to connect device endpoints. Telephony gateway 308, in one example, connects internal telephony circuits with PSTN. Media gateway 310 provides transformation and interworking between media streams that may employ different network standards, communication protocols, codecs and physical connections. Meeting Server 312 is a server hosting and managing one or more meetings.

The following processes illustrate three (3) ACE scenarios to seamlessly elevate calls to a video conference meeting in view of diagram 300. The first scenario involves elevating PSTN call to meeting. The procedure includes:

1) During multiparty call, any capable Zoom or ACE application will present option to elevate to a meeting.
2) When "meet" option is selected, Zoom or ACE service will be trigger to start an online meeting session.
3) Meeting session will establish with Zoom or ACE meeting server.
4) User's unique meeting ID/account will be sent to Zoom or ACE Call Switch via SIP (session initiation protocol) as JSON (JavaScript Object Natation) payload.
5) Call Switch checks all connected parties that are using ACE or Zoom application.
6) Parties with meeting capable clients (or user devices) are signaled via SIP with request to establish a new call (leg) to connect to the meeting which can be a real-time interactive video conference meeting. Once connection to meeting is established, audio call leg is disconnected.
6A) If a party is not using capable Zoom application, Call Switch initiates another call leg via SIP to Zoom Telephony Gateway with Meeting ID and attendee ID. In one example, SIP Invite also contains command to bypass Zoom telephony gateway's Interactive Voice Response (IVR) menu. Once connection is established, the party is disconnected from original multiparty call session.
7) With media and signaling established, all parties can continue conversation via Zoom online meeting service.
8) All parties are identified by username or telephone number within meeting service. If telephone numbers have associated names in the database or Zoom database that is accessible, the name will be display with or replace the telephone number.
9) Parties using capable Zoom application will have access to share and consume video and content feeds.

The second scenario relates to transferring PSTN call to meeting. The procedure includes:

1. During a Zoom meeting session, any call switch party is capable of receiving a PSTN call. The Zoom meeting session is referred to a real-time interactive video conference meeting.
2. Call switch will send a signal to Zoom or ACE application via SIP with caller's information.
3. The ACE or Zoom application will present incoming PSTN call to a party or host attendee to accept or decline the incoming PSTN call.
4. Once the party accepts the call, another leg is established between the call switch via SIP to Zoom or ACE application.
5. The ACE or Zoom application would pause the media session for the audio portion of the meeting
6. When the PSTN call is connected, the party is then presented with an option to transfer the call to the existing meeting.
7. When transferred, the Zoom or ACE application will send a request to Zoom Call Switch to initiate another call leg via SIP to Zoom Telephony Gateway with Meeting ID and attendee ID, along with command to bypass Zoom Telephony Gateways' IVR menu. Once the connection is established, the PSTN call will be disconnected from original call session.

8. With media and signal established, all parties can communicate via Zoom online meeting service.
9. The transferred party will appear in the Meeting and identifiable by their username or telephone number to other participants. If telephone numbers have name associated within Zoom's database or database that Zoom has accessible, the name will be display with or replace the telephone number.

The third (3) scenario covers merging meeting and PSTN conference. The procedure includes:
1. During a Zoom meeting and PSTN conference session, any Zoom Call can be merged to a Zoom meeting.
2. The Zoom or ACE application will be notified of incoming call, either Zoom Phone or Zoom Video presenting an option to decline, or merge to the existing meeting.
3. When merging the call, Zoom application will transfer the video to the correct MMR and point the Zoom Client to join the existing Meeting ID.
4. When merging the PSTN call, the Zoom or ACE application will send a request to Zoom Call Switch to initiate the transfer from Call Switch to MMR via SIP to Zoom Telephony Gateway with Meeting ID and attendee ID, along with command to bypass Zoom Telephony Gateways' IVR menu.
5. With media and signal established, all parties can communicate via Zoom online meeting service.
6. The merged party will appear in the Meeting and identifiable by their username or telephone number to other participants. If telephone numbers have associated names within Zoom's database or database which is accessible by ACE or Zoom application, the name will be displayed with or replace the telephone number.

Figure 4:
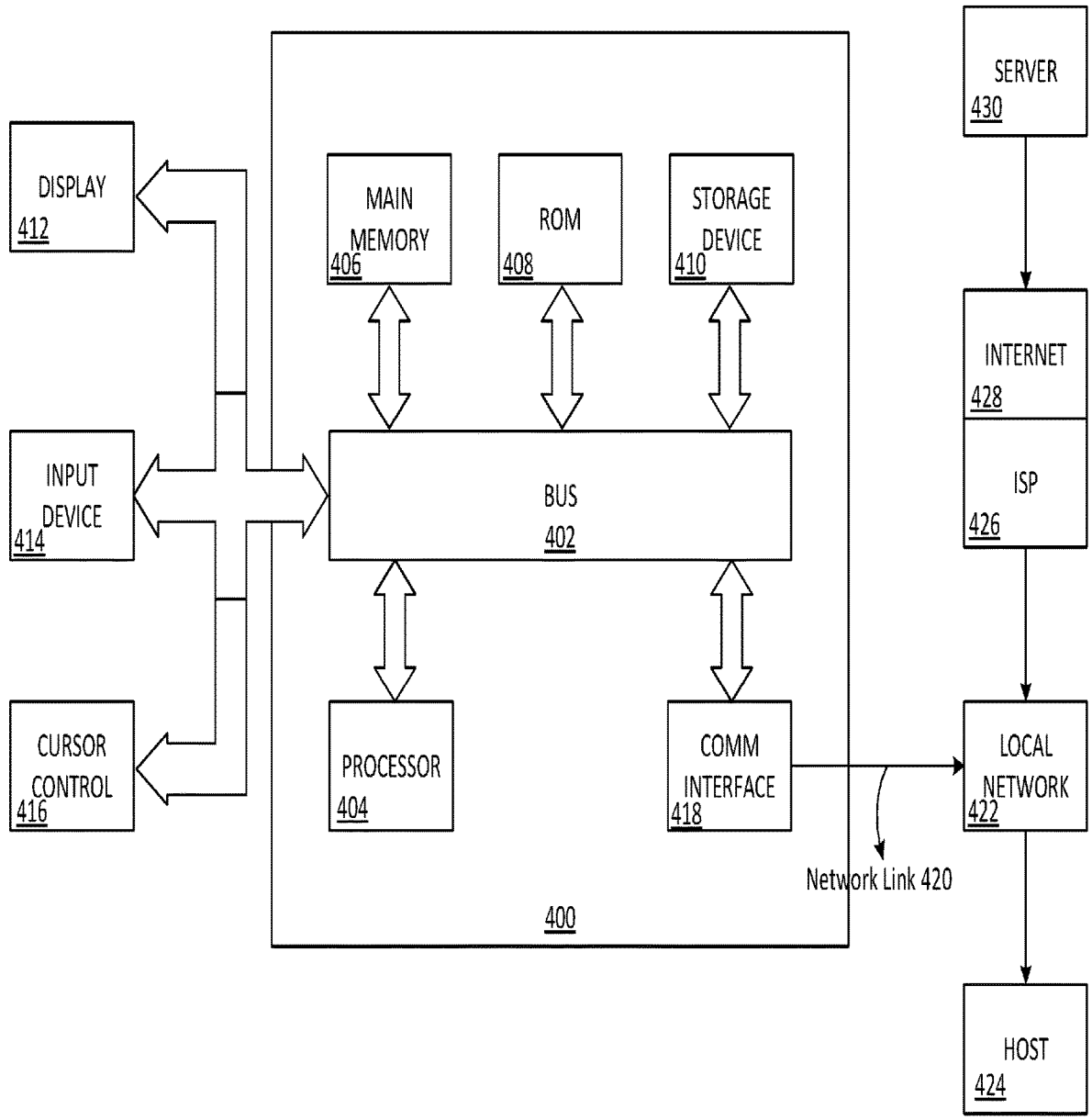
FIG. 4 is a block diagram illustrating a system or computer capable of facilitating ACE operation in accordance with one embodiment of the present invention.

FIG. 4 is a block diagram illustrating a system or computer capable of facilitating ACE operation in accordance with one embodiment of the present invention. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or a solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on a storage device either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated service digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 5:
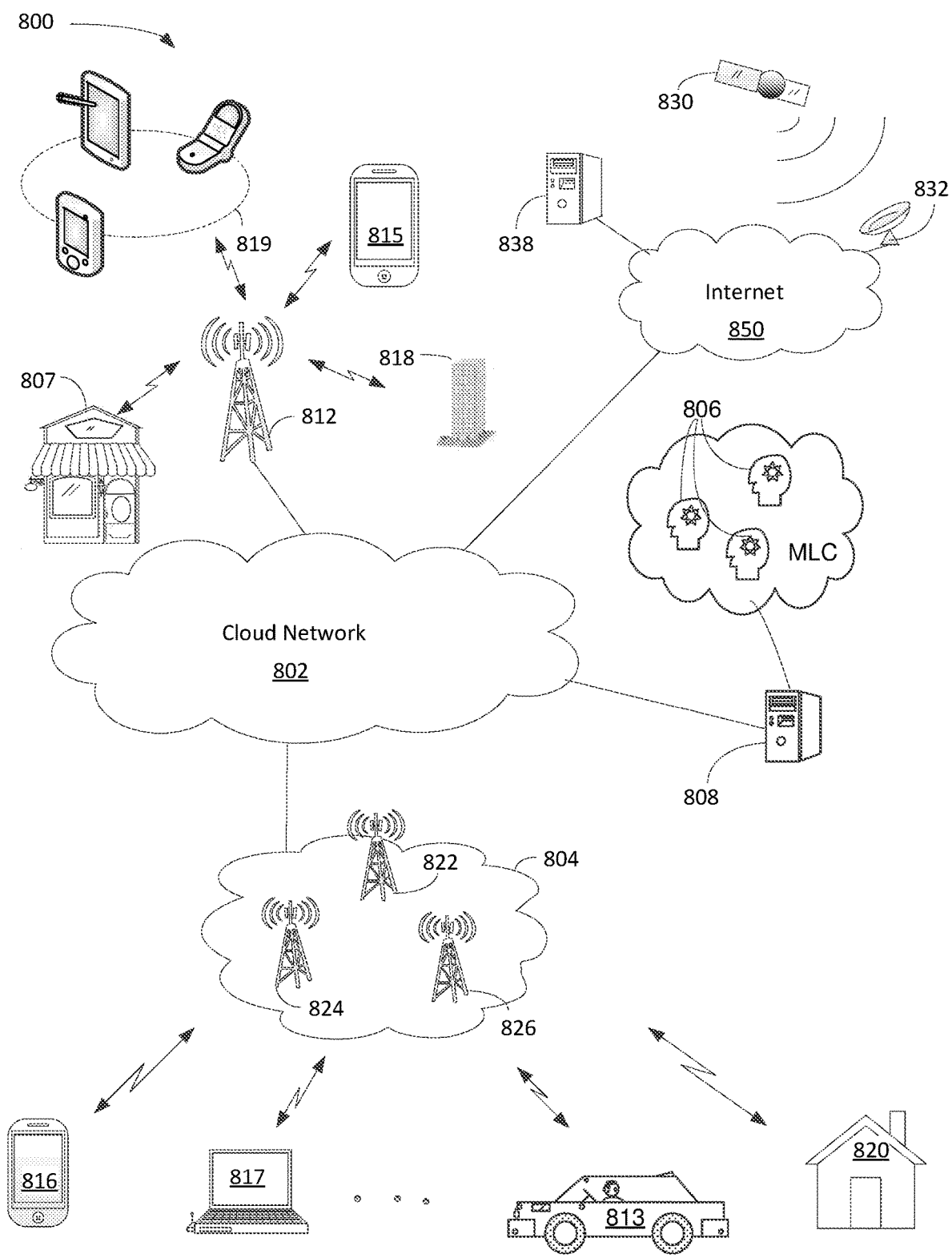
FIG. 5 is a block diagram illustrating various applications of ACE for facilitating elevation of calls to video conference(s) in accordance with one embodiment of the present invention.

FIG. 5 is a block diagram illustrating various applications of ACE for facilitating elevation of calls to video conference(s) in accordance with one embodiment of the present invention. Diagram 800 illustrates ACE server 808, communication network 802, switching network 804, Internet 850, and portable electric devices 813-819. In one aspect, ACE application is configured to facilitate elevating a phone call(s) to a new or existing real-time interactive video conference where different attendees situated in various different geographic locations. Network or cloud network 802 can be wide area network, metropolitan area network ("MAN"), local area network ("LAN"), satellite/terrestrial network, or a combination of wide area network, MAN, and LAN. It should be noted that the underlying concept of the exemplary embodiment(s) of the present invention would not change if one or more blocks (or networks) were added to or removed from diagram 800.

Network 802 includes multiple network nodes, not shown in FIG. 5, wherein each node may include mobility management entity ("MME"), radio network controller ("RNC"), serving gateway ("S-GW"), packet data network gateway ("P-GW"), or Home Agent to provide various network functions. Network 802 is coupled to Internet 850, AI server 808, base station 812, and switching network 804. Server 808, in one embodiment, includes machine learning computers ("MLC") 806.

Switching network 804, which can be referred to as packet core network, includes cell sites 822-826 capable of providing radio access communication, such as 3G (3rd generation), 4G, or 5G cellular networks. Switching network 804, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 804 is logically coupling multiple users and/or mobiles 816-820 across a geographic area via cellular and/or wireless networks. It should be noted that the geographic area may refer to a campus, city, metropolitan area, country, continent, or the like.

Base station 812, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 815, laptop computer 817, iPhone° 816, tablets and/or iPad® 819 via wireless communications. Handheld device can also be a smartphone, such as iPhone®, BlackBerry®, Android®, and so on. Base station 812, in one example, facilitates network communication between mobile devices such as portable handheld device 813-819 via wired and wireless communications networks. It should be noted that base station 812 may include additional radio towers as well as other land switching circuitry.

Internet 850 is a computing network using Transmission Control Protocol/Internet Protocol ("TCP/IP") to provide linkage between geographically separated devices for communication. Internet 850, in one example, couples to supplier server 838 and satellite network 830 via satellite receiver 832. Satellite network 830, in one example, can provide many functions as wireless communication as well as global positioning system ("GPS"). It should be noted that HAS can be applied a lot of fields, such as, but not limited to, smartphones 813-819, satellite network 830, automobiles 813, AI server 808, business 807, and homes 820.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 6:
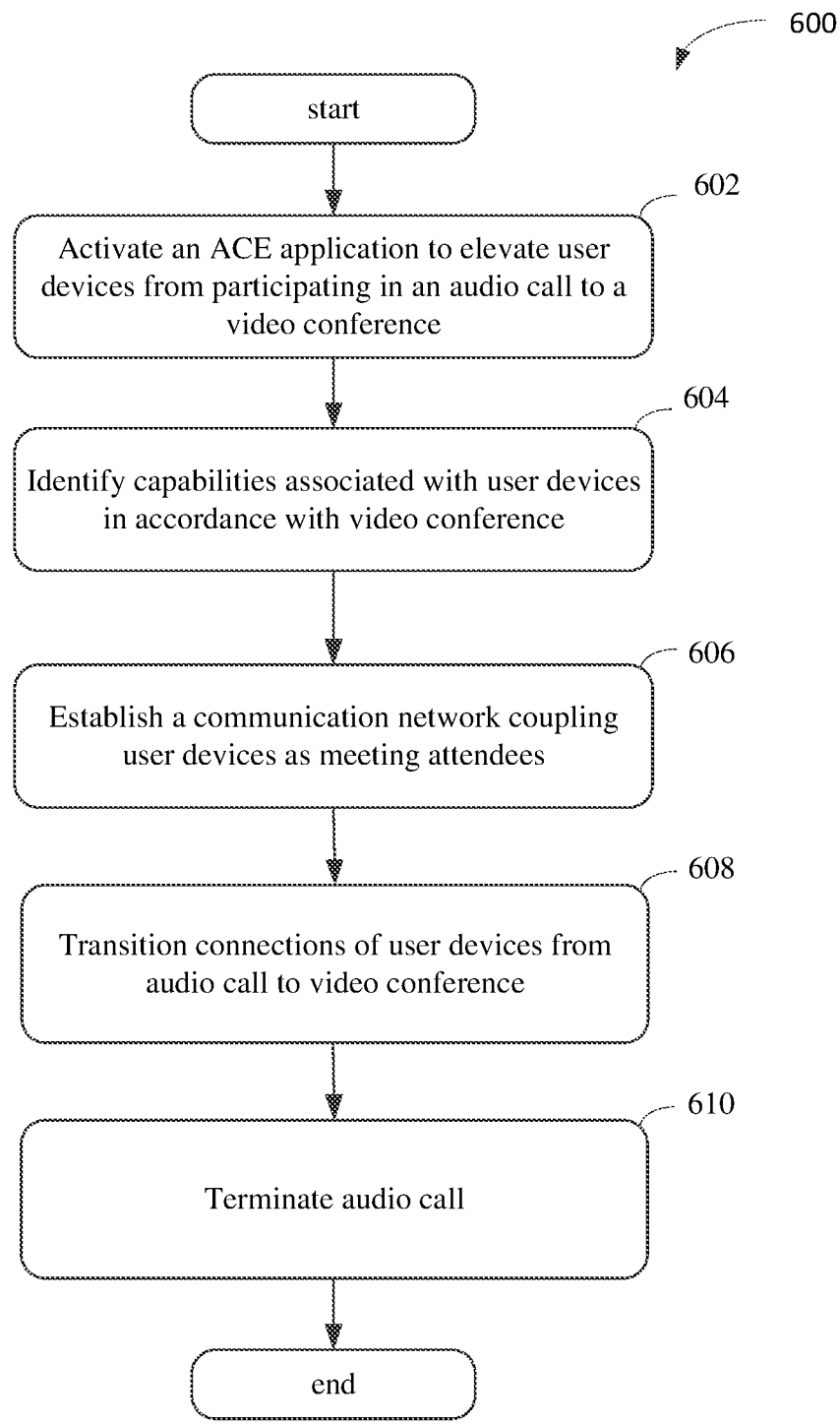
FIG. 6 is a flowchart illustrating a process of implementation of ACE operation in accordance with one embodiment of the present invention.

FIG. 6 is a flowchart 600 illustrating a process of implementation of ACE operation in accordance with one embodiment of the present invention. At block 602, an ACE process capable of facilitating a transition from a phone call to a video conference activates an ACE application to elevate one or more user devices from participating in an audio call to a video conference based on a conference selection selected by a meeting initiator. In one aspect, the conference selection capable of activating a real-time interactive video conference is presented to at least one of the user devices during a multiparty telephone call. In one example, after triggering a video conference service to start an online meeting session when the conference option is selected, a meeting session with a meeting server is established.

At block 604, the process is able to identify the capabilities associated with the user devices in accordance with activation of the video conference. For example, the meeting initiator's unique meeting identifier ("ID") and account information are forwarded to a call switch via session initiation protocol ("SIP"). The call switch subsequently checks all connected parties using capable video conference application. In one embodiment, upon signaling parties with meeting capable clients via SIP request for establish a new call leg, the audio call leg is disconnected upon establishing the connection of the video conference session. Upon initiating another call leg by the call switch to a telephony gateway with meeting ID and attendee ID if a party is not using video capable conference application (i.e., not in a video capable mode) and bypassing the telephony gateway's interactive voice response menu otherwise used for the video conference session, the process disconnects the party from original multiparty call session after a connection of video conference session is established.

At block 606, a communication network coupling the user devices as meeting attendees is established for facilitating the video conference based on identified capabilities of the user devices. In one aspect, the process is configured to facilitate continuing conversation for all parties via an online meeting service after media and signaling are established.

At block 608, the connections of the user devices are transitioned from the audio call to the video conference. In one aspect, after identifying all parties by username or telephone number within the meeting service in accordance with telephone numbers associated with a database, the parties are allowed to share and consume video and content feeds. For example, the process facilitates sharing of video images, audio sounds, file sharing, and video clips with at least one of user devices.

At block 610, the audio call is terminated or ended once the video conference is established.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method, comprising:
receiving, during a video conference session to which user devices are connected, a public switched telephone network (PSTN) call from a new user device separate from the user devices;
forwarding caller information associated with the PSTN call from a call switch to an automatic call-to-conference elevation (ACE) application via a first session initiation protocol (SIP) request;
transmitting, to at least one of the user devices, data configured to present, on at least one screen of the at least one of the user devices, a prompt associated with the PSTN call;
establishing a new session leg between the call switch and the ACE application based on a selection associated with the prompt;
transitioning, based on video capabilities of the new user device indicating that the new user device is other than video capable, a connection of the new user device from the PSTN call to the video conference session over the new session leg via a second SIP request that includes a command to bypass an interactive voice response menu otherwise used for the video conference session; and
terminating the PSTN call.

2. The method of claim 1, comprising:
sending a request from the ACE application to the call switch to initiate another call leg via a new SIP request to a telephony gateway based on a meeting identifier and an attendee identifier.

3. The method of claim 1, comprising:
transferring the PSTN call to the video conference session by bypassing a telephony gateway.

4. The method of claim 1, comprising:
disconnecting the PSTN call from an original call session based on a connection of the PSTN call to the video conference session.

5. The method of claim 1, comprising:
facilitating communication for all participants after media and signaling are established.

6. The method of claim 1, comprising:
identifying a participant using the new user device by username or telephone number to other participants of the video conference session.

7. The method of claim 1, comprising:
identifying the capabilities of the new user device based on the selection associated with the prompt.

8. The method of claim 1, comprising:
connecting different user devices from the PSTN call to the video conference session in different ways based on capabilities of the different user devices.

9. A non-transitory computer readable medium storing instructions operable to cause one or more processors to perform operations comprising:
receiving, during a video conference session to which user devices are connected, a public switched telephone network (PSTN) call from a new user device separate from the user devices;
forwarding caller information associated with the PSTN call from a call switch to an automatic call-to-conference elevation (ACE) application via a first session initiation protocol (SIP) request;
transmitting, to at least one of the user devices, data configured to present, on at least one screen of the at least one of the user devices, a prompt associated with the PSTN call;
establishing a new session leg between the call switch and the ACE application based on a selection associated with the prompt;
transitioning, based on video capabilities of the new user device indicating that the new user device is other than video capable, a connection of the new user device from the PSTN call to the video conference session over the new session leg via a second SIP request that includes a command to bypass an interactive voice response menu otherwise used for the video conference session; and
terminating the PSTN call.

10. The non-transitory computer readable medium of claim 9, wherein transitioning the connection of the new user device from the PSTN call to the video conference session over the new session leg comprises:
seamlessly connecting the new user device to the video conference session from the PSTN call via the new session leg based on a selection of a meeting option for transferring the PSTN call to the video conference session.

11. The non-transitory computer readable medium of claim 9, wherein a rejection of the prompt results in a rejection of the PSTN call.

12. The non-transitory computer readable medium of claim 9, wherein a user device is connected to the video conference session in an audio-only mode based on capabilities of the user device indicating that the user device is other than video capable.

13. The non-transitory computer readable medium of claim 9, wherein a user device is connected to the video conference session in a video capable mode based on capabilities of the user device indicating that the user device is video capable.

14. The non-transitory computer readable medium of claim 9, wherein participants connected to the video conference session are identified to other participants of the video conference session by username or telephone number.

15. A system, comprising:
one or more memories configured to store instructions; and
one or more processors configured to execute the instructions to:
receive, during a video conference session to which user devices are connected, a public switched telephone network (PSTN) call from a new user device separate from the user devices;
forward caller information associated with the PSTN call from a call switch to an automatic call-to-conference elevation (ACE) application via a first session initiation protocol (SIP) request;
transmit, to at least one of the user devices, data configured to present, on at least one screen of the at least one of the user devices, a prompt associated with the PSTN call;
establish a new session leg between the call switch and the ACE application based on a selection associated with the prompt;
transition, based on video capabilities of the new user device indicating that the new user device is other than video capable, a connection of the new user device from the PSTN call to the video conference session over the new session leg via a second SIP request that includes a command to bypass an interactive voice response menu otherwise used for the video conference session; and
terminate the PSTN call.

16. The system of claim 15, wherein a rejection of the prompt causes a disconnection of the PSTN call.

17. The system of claim 15, wherein the new session leg is established based on identified capabilities of the new user device, the identified capabilities including the video capabilities.

18. The system of claim 15, wherein the one or more processors are configured to execute the instructions to:
identify capabilities of user devices to connect to the video conference session from the PSTN call.

19. The system of claim 15, wherein the PSTN call is disconnected from an original call session based on a connection of the PSTN call to the video conference session.

20. The system of claim 15, wherein the PSTN call is transferred to the video conference session by bypassing a telephony gateway.

* * * * *